(12) United States Patent
Dreissig et al.

(10) Patent No.: US 9,105,401 B2
(45) Date of Patent: Aug. 11, 2015

(54) WET ELECTROLYTIC CAPACITOR CONTAINING A GELLED WORKING ELECTROLYTE

(71) Applicant: AVX Corporation, Fountain Inn, SC (US)

(72) Inventors: Dirk H. Dreissig, Myrtle Beach, SC (US); James Steven Bates, Saco, ME (US); Andrew Paul Ritter, Surfside Beach, SC (US); Zebbie Lynn Sebald, Myrtle Beach, SC (US); Mitchell D. Weaver, Myrtle Beach, SC (US); Robert Hazen Pease, North Berwick, ME (US)

(73) Assignee: AVX Corporation, Fountain Inn, SC (US)

( * ) Notice: Subject to any disclaimer, the term of this patent is extended or adjusted under 35 U.S.C. 154(b) by 232 days.

(21) Appl. No.: 13/685,755

(22) Filed: Nov. 27, 2012

(65) Prior Publication Data

US 2013/0141841 A1    Jun. 6, 2013

Related U.S. Application Data

(60) Provisional application No. 61/566,160, filed on Dec. 2, 2011.

(51) Int. Cl.
*H01G 13/00* (2013.01)
*H01G 9/028* (2006.01)
*H01G 9/035* (2006.01)
(Continued)

(52) U.S. Cl.
CPC ............. *H01G 9/035* (2013.01); *H01G 9/0036* (2013.01); *H01G 9/028* (2013.01); *H01G 13/00* (2013.01); *H01G 9/0425* (2013.01); *H01G 9/052* (2013.01); *H01G 11/54* (2013.01); *H01G 11/60* (2013.01); *H01G 11/64* (2013.01); *Y10T 29/43* (2015.01)

(58) Field of Classification Search
USPC .................................. 361/502–506, 523–526
See application file for complete search history.

(56) References Cited

U.S. PATENT DOCUMENTS

| | | |
|---|---|---|
| 3,138,746 A | 6/1964 | Burger et al. |
| 4,017,302 A | 4/1977 | Bates et al. |

(Continued)

FOREIGN PATENT DOCUMENTS

| | | |
|---|---|---|
| EP | 0989572 A2 | 3/2000 |
| EP | 1538642 A1 | 6/2005 |

(Continued)

OTHER PUBLICATIONS

Abstract of Japanese Patent No. JP 04-266009 dated Sep. 22, 1992, 1 pages.

(Continued)

*Primary Examiner* — Dion R Ferguson
(74) *Attorney, Agent, or Firm* — Dority & Manning, P.A.

(57) ABSTRACT

A wet electrolytic capacitor is provided. The capacitor contains an anode comprising an anodically oxidized pellet formed from a pressed and sintered powder, a cathode that contains a metal substrate coated with a conductive polymer, and a working electrolyte in communication with the anode and the cathode. The working electrolyte is in the form of a gel and comprises an ammonium salt of an organic acid, inorganic oxide particles, an acid, and a solvent system that comprises water. The working electrolyte has a pH value of from about 5.0 to about 8.0.

34 Claims, 3 Drawing Sheets

(51) Int. Cl.

| | | |
|---|---|---|
| H01G 9/00 | (2006.01) | |
| H01G 11/60 | (2013.01) | |
| H01G 11/64 | (2013.01) | |
| H01G 11/54 | (2013.01) | |
| H01G 9/042 | (2006.01) | |
| H01G 9/052 | (2006.01) | |

(56) References Cited

U.S. PATENT DOCUMENTS

| | | |
|---|---|---|
| 4,441,927 A | 4/1984 | Getz et al. |
| 4,469,610 A | 9/1984 | Fukuda et al. |
| 4,483,819 A | 11/1984 | Albrecht et al. |
| 4,522,737 A | 6/1985 | MacNamee |
| 4,555,268 A | 11/1985 | Getz |
| 4,715,976 A | 12/1987 | Mori et al. |
| 4,762,630 A | 8/1988 | Shinozaki et al. |
| 4,786,429 A | 11/1988 | Mori et al. |
| 4,992,910 A | 2/1991 | Evans |
| 5,098,485 A | 3/1992 | Evans |
| 5,338,472 A | 8/1994 | Yokoyama et al. |
| 5,369,547 A | 11/1994 | Evans |
| 5,400,211 A | 3/1995 | Evans |
| 5,435,874 A | 7/1995 | Takeuchi et al. |
| 5,469,325 A | 11/1995 | Evans |
| 5,473,503 A | 12/1995 | Sakata et al. |
| 5,507,966 A | 4/1996 | Liu et al. |
| 5,559,667 A | 9/1996 | Evans |
| 5,571,640 A | 11/1996 | Takeuchi et al. |
| 5,737,181 A | 4/1998 | Evans |
| 5,754,394 A | 5/1998 | Evans et al. |
| 5,786,980 A | 7/1998 | Evans |
| 5,894,403 A | 4/1999 | Shah et al. |
| 5,920,455 A | 7/1999 | Shah |
| 5,926,362 A | 7/1999 | Muffoletto et al. |
| 5,982,609 A | 11/1999 | Evans |
| 6,037,077 A | 3/2000 | Nowaczyk |
| 6,096,391 A | 8/2000 | Muffoletto et al. |
| 6,110,622 A | 8/2000 | Frysz et al. |
| 6,157,531 A | 12/2000 | Breyen et al. |
| 6,184,160 B1 | 2/2001 | Yan et al. |
| 6,191,936 B1 | 2/2001 | Webber et al. |
| 6,208,502 B1 | 3/2001 | Hudis et al. |
| 6,219,222 B1 | 4/2001 | Shah et al. |
| 6,224,985 B1 | 5/2001 | Shah et al. |
| 6,275,373 B1 | 8/2001 | Marshall et al. |
| 6,307,732 B1 | 10/2001 | Tsubaki et al. |
| 6,332,900 B1 | 12/2001 | Muffoletto et al. |
| 6,404,619 B1 | 6/2002 | Marshall et al. |
| 6,420,066 B1 | 7/2002 | Frustaci et al. |
| 6,452,784 B2 | 9/2002 | Nakada et al. |
| 6,455,108 B1 | 9/2002 | Muffoletto et al. |
| 6,461,759 B1 | 10/2002 | Miller et al. |
| 6,461,771 B1 | 10/2002 | Frysz |
| 6,468,605 B2 | 10/2002 | Shah et al. |
| 6,522,524 B1 | 2/2003 | Feger et al. |
| 6,562,255 B1 | 5/2003 | Feger |
| 6,587,329 B1 | 7/2003 | Feger |
| 6,589,441 B1 | 7/2003 | Feger |
| 6,594,139 B2 | 7/2003 | Muffoletto et al. |
| 6,594,140 B1 | 7/2003 | Evans et al. |
| 6,599,580 B2 | 7/2003 | Muffoletto et al. |
| 6,613,474 B2 | 9/2003 | Frustaci et al. |
| 6,652,729 B2 | 11/2003 | Melody et al. |
| 6,687,117 B2 | 2/2004 | Liu et al. |
| 6,707,660 B1 | 3/2004 | Evans et al. |
| 6,721,169 B2 | 4/2004 | Melody et al. |
| 6,721,170 B1 | 4/2004 | Evans et al. |
| 6,727,022 B2 | 4/2004 | Gan et al. |
| 6,740,420 B2 | 5/2004 | Muffoletto et al. |
| 6,743,370 B1 | 6/2004 | Feger et al. |
| 6,743,547 B2 | 6/2004 | Gan et al. |
| 6,744,619 B1 | 6/2004 | Feger |
| 6,773,632 B1 | 8/2004 | Marshall et al. |
| 6,788,523 B1 | 9/2004 | Hossick-Schott et al. |
| 6,801,424 B1 | 10/2004 | Nielsen et al. |
| 6,828,059 B2 | 12/2004 | Miller et al. |
| 6,842,328 B2 | 1/2005 | Schott et al. |
| 6,859,354 B2 | 2/2005 | Viste et al. |
| 6,888,717 B2 | 5/2005 | Kinard et al. |
| 6,893,777 B2 | 5/2005 | Probst |
| 6,939,774 B2 | 9/2005 | Viste et al. |
| 6,951,576 B1 | 10/2005 | Takeuchi |
| 7,000,297 B2 | 2/2006 | Frustaci et al. |
| 7,002,790 B2 | 2/2006 | Hossick-Schott et al. |
| 7,038,901 B2 | 5/2006 | Muffoletto et al. |
| 7,072,171 B1 | 7/2006 | Muffoletto et al. |
| 7,079,377 B2 | 7/2006 | Schott et al. |
| 7,081,141 B2 | 7/2006 | Hossick-Schott et al. |
| 7,099,143 B1 | 8/2006 | Fife et al. |
| 7,116,547 B2 | 10/2006 | Seitz et al. |
| 7,169,284 B1 | 1/2007 | Jiang et al. |
| 7,224,576 B2 | 5/2007 | Hossick-Schott |
| 7,244,279 B2 | 7/2007 | Seitz et al. |
| 7,256,982 B2 | 8/2007 | Lessner et al. |
| 7,268,996 B1 | 9/2007 | Dapo et al. |
| 7,271,994 B2 | 9/2007 | Stemen et al. |
| 7,279,015 B2 | 10/2007 | Merker |
| 7,314,685 B2 | 1/2008 | Brown et al. |
| 7,324,329 B2 | 1/2008 | Dweik et al. |
| 7,474,521 B2 | 1/2009 | Hossick-Schott |
| 7,483,260 B2 | 1/2009 | Ziarniak et al. |
| 7,485,240 B1 | 2/2009 | Feger et al. |
| 7,499,260 B2 | 3/2009 | Schott et al. |
| 7,585,428 B1 | 9/2009 | Marshall et al. |
| 7,667,954 B2 | 2/2010 | Lessner et al. |
| 7,952,853 B2 | 5/2011 | Viste et al. |
| 8,279,585 B2 | 10/2012 | Dreissig et al. |
| 8,405,956 B2 | 3/2013 | Dreissig et al. |
| 2004/0240152 A1 | 12/2004 | Schott et al. |
| 2004/0243183 A1 | 12/2004 | Norton et al. |
| 2006/0070492 A1 | 4/2006 | Qiu |
| 2007/0211413 A1 | 9/2007 | Fife et al. |
| 2007/0274025 A1 | 11/2007 | Lessner et al. |
| 2008/0007894 A1 | 1/2008 | Seitz et al. |
| 2008/0013257 A1 | 1/2008 | Seitz et al. |
| 2008/0085451 A1 | 4/2008 | Freitag et al. |
| 2008/0229565 A1 | 9/2008 | Schott et al. |
| 2008/0304208 A1 | 12/2008 | Murakami et al. |
| 2009/0035652 A1 | 2/2009 | Freitag et al. |
| 2010/0142124 A1 | 6/2010 | Dreissig et al. |
| 2010/0238608 A1* | 9/2010 | Dreissig et al. ............... 361/505 |
| 2010/0239916 A1* | 9/2010 | Bhattacharryya et al. .... 429/300 |
| 2010/0289458 A1 | 11/2010 | Viste et al. |
| 2010/0302709 A1* | 12/2010 | Dreissig et al. ............... 361/505 |

FOREIGN PATENT DOCUMENTS

| | | |
|---|---|---|
| EP | 2416331 A1 | 2/2012 |
| GB | 2447724 A | 9/2008 |

OTHER PUBLICATIONS

Abstract of Article—Rudge et al., "Conducting Polymers as Active Materials in Electrochemical Capacitors," Journal of Power Sources, vol. 47, Issues 1-2, Jan. 1, 1994, pp. 89-107.

Paper—Koenitzer et al. "Tantalum Flakes—Powders for High Reliability Electrolytic Capacitor Applications," 4 pages.

Paper—Lin et al., "Effect of Water Content in Ethylene Glycol as Electrolyte for Fabrication of Anodic Titania Nanotubes: Synchrotron XRD Characterization," 1 page.

GB Search Report for GB1221405.2 dated Mar. 5, 2013, 3 pages.

* cited by examiner

WET ELECTROLYTIC CAPACITOR CONTAINING A GELLED WORKING ELECTROLYTE

The present application claims priority to U.S. Provisional Application Ser. No. 61/566,160, filed on Dec. 2, 2011, which is incorporated herein in its entirety by reference thereto.

BACKGROUND OF THE INVENTION

High voltage electrolytic capacitors are employed as energy storage reservoirs in many applications, including implantable medical devices. These capacitors are required to have a high energy density because it is desirable to minimize the overall size of the implanted device. This is particularly true of an implantable cardioverter defibrillator ("ICD"), also referred to as an implantable defibrillator, because the high voltage capacitors used to deliver the defibrillation pulse can occupy as much as one third of the ICD volume. ICDs typically use two to four electrolytic capacitors in series to achieve the desired high voltage for shock delivery. Typically, metal foils (e.g., aluminum foil) are used in the electrolytic capacitor due to their small size. Because the electrostatic capacitance of the capacitor is proportional to its electrode area, the surface of the metallic foil may be, prior to the formation of the dielectric film, roughened or subjected to a chemical conversion to increase its effective area. This step of roughening the surface of the metallic foil is called etching. Etching is normally carried out either by the method (chemical etching) of conducting immersion into a solution of hydrochloric acid or by the method (electrochemical etching) of carrying out electrolysis in an aqueous solution of hydrochloric acid. The capacitance of the electrolytic capacitor is determined by the extent of roughing (the surface area) of the anode foil and the thickness and the dielectric constant of the oxide film.

Due to the limited surface area that may be provided by etching metallic foils, attempts have also been made to employ porous sintered pellets in wet electrolytic capacitors—i.e., "wet tantalum" capacitors. A tantalum pellet, for instance, may be formed by compressing a powder under high pressure and sintering at high temperature to form a sponge-like structure, which is very strong and dense but also highly porous. The porosity of the resulting tantalum pellet provides a large internal surface area. Despite its high surface area, however, tantalum pellets may still present high ESR and sensitivity of the capacitance to frequency, particularly at the high voltages often encountered in medical devices. These problems are particularly compounded by instability or degradation of the electrolyte contained within the capacitor.

As such, a need currently exists for an improved wet electrolytic capacitor for use in implantable medical devices, such as defibrillators.

SUMMARY OF THE INVENTION

In accordance with one embodiment of the present invention, a wet electrolytic capacitor is disclosed that contains an anode comprising an anodically oxidized pellet formed from a pressed and sintered powder, a cathode that comprises a metal substrate coated with a conductive polymer, and a working electrolyte in communication with the anode and the cathode. The working electrolyte is in the form of a gel and comprises an ammonium salt of an organic acid, inorganic oxide particles, an acid, and a solvent system that comprises water. The working electrolyte has a pH value of from about 5.0 to about 8.0.

In accordance with another embodiment of the present invention, a working electrolyte for a wet electrolytic capacitor is disclosed. The electrolyte comprises from about 1 wt. % to about 40 wt. % of at least one ammonium salt of an organic acid, from about 0.01 wt. % to about 10 wt. % of at least one acid, from about 0.5 wt. % to about 20 wt. % of inorganic oxide particles, from about 30 wt. % to about 70 wt. % of water, and from about 5 wt. % to about 40 wt. % of at least one secondary solvent. The working electrolyte is in the form of a gel and has a pH value of from about 5.0 to about 8.0 and has a conductivity of from about 10 to about 80 milliSiemens per centimeter, determined at a temperature of 25° C.

In accordance with another embodiment of the present invention, a method for forming a wet electrolytic capacitor is disclosed. The method comprises forming a mixture that comprises an ammonium salt of an organic acid, inorganic oxide particles, an acid, and a solvent system that comprises water; inducing gelation of the mixture so that it exhibits a first phase angle δ of from about 50° to 90°; placing the gelled mixture into communication with an anode, cathode, or both, wherein the anode comprises an anodically oxidized pellet formed from a pressed and sintered powder and the cathode comprises a metal substrate coated with a conductive polymer; and thereafter, allowing the mixture to further gel to form a working electrolyte that exhibits a second phase angle δ of from 0° to about 20°, wherein the working electrolyte further has a pH value of from about 5.0 to about 8.0.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
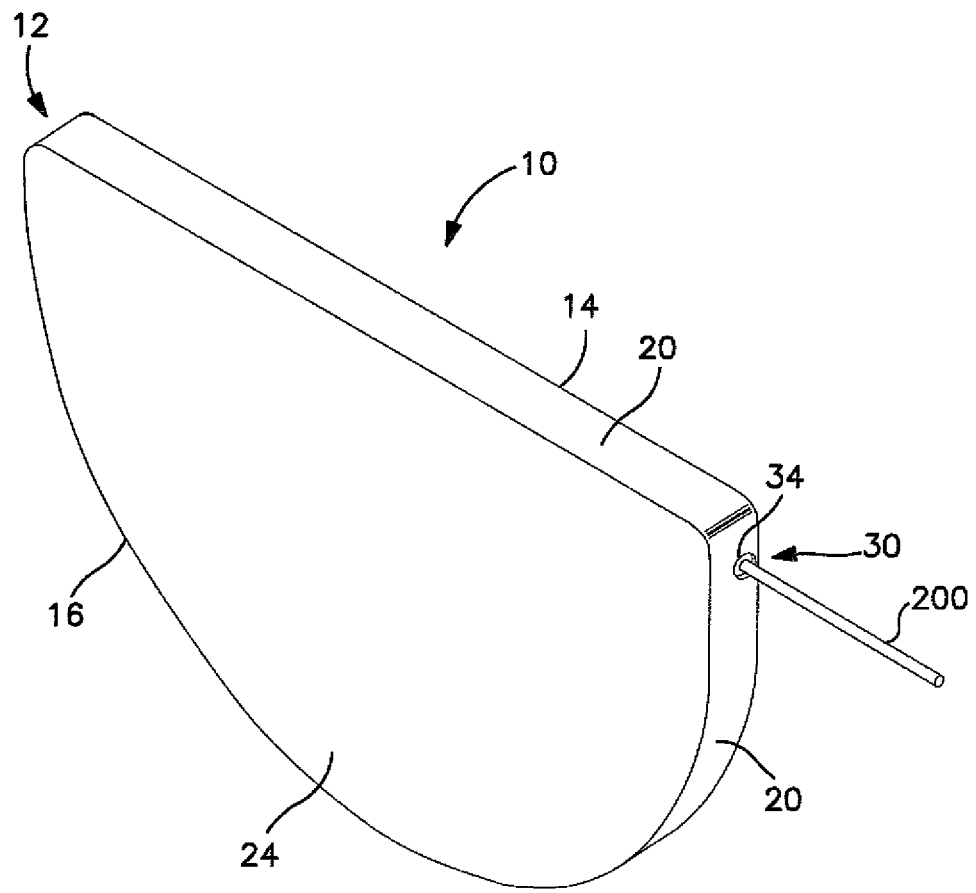
FIG. 1 is a perspective view of one embodiment of the wet electrolytic capacitor of the present invention.

Repeat use of reference characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

The present invention is directed to a wet electrolytic capacitor that contains an anodically oxidized porous anode body, a cathode containing a metal substrate coated with a conductive polymer, and a working electrolyte that is the electrically active material that provides a connecting path between the anode and cathode. The working electrolyte has a neutral pH value and is in the form of a viscoelastic gel, which helps to chemically stabilize the electrolyte and improve the uniformity of wetting of the anode-cathode interface. Contrary to conventional wisdom, the capacitor of the present invention can be formed from such a gel and still achieve a relatively high capacitance and energy density without also exhibiting a high equivalent series resistance ("ESR"). Without intending to be limited by theory, the present inventors believe that this unique combination of electrical properties can be achieved through selective control over various aspects of the working electrolyte, anode, and cathode systems. For example, the working electrolyte includes an ammonium salt of an organic acid, inorganic oxide particles, acid, and aqueous solvent system. When employed in appropriate concentrations, the combination of these ingredients can result in an electrolyte that is gelled, but yet still has a high conductivity and a neutral pH value. The highly conductive, gelled electrolyte can also act in concert with the cathode system to achieve the desired electrical performance. Without intending to be limited by theory, the present inventors believe that charging of the capacitor to a high voltage (e.g., greater than the formation voltage) can enhance charge density. Nevertheless, because the conductive polymer is generally amorphous, it can dissipate and/or absorb the heat associated with the high voltage. Upon discharge, the conductive polymer likewise "relaxes" and allows ions in the electrolyte to move out of the polymer layer. Through such swelling and relaxation mechanism, charge density near the electrode can be increased without a chemical reaction with the electrolyte.

Various embodiments of the present invention will now be described in more detail.

I. Working Electrolyte

As noted above, the working electrolyte is in the form of a viscoelastic "gel", which is generally defined as a solid or semi-solid colloidal suspension that contains a continuous phase and a dispersed phase, wherein at least one of the phases is a solid and at least one of the phases is a liquid. For example, a hydrogel may be formed when the inorganic oxide particles are crosslinked to form a continuous phase and the solvent contains water as a disperse phase that is entrapped within the crosslinked network. Regardless of its exact form, the viscoelastic gel within the capacitor is in the form of a semi-solid or solid so that it is not readily flowable at room temperature. This property can be represented by the viscoelastic phase angle $\delta$, which is the degree to which the sinusoidal time variation in the stress is out of phase with the sinusoidal time variation in the shear rate. The phase angle $\delta$ for an ideal elastic solid is 0° (in phase) and the phase angle $\delta$ for an ideal viscous liquid is 90° (out of phase). In the present invention, the gelled electrolyte typically exhibits a phase angle $\delta$ of from 0° to about 20°, in some embodiments from 0.1° to about 5°, and in some embodiments, from about 0.2° to about 2°. Another parameter that can represent the viscoelastic behavior of the gel is the storage modulus, G', which is determined by dividing the "in-phase" component of the stress (representing solid-like behavior) by the maximum strain. Typically, the gelled electrolyte of the present invention exhibits a storage modulus of about 5 kilopascals ("kPa") or more, in some embodiments about 10 kPa or more, and in some embodiments from about 15 to about 50 kPa. The phase angle and storage modulus can be determined at room temperature (e.g., 25° C.) by dynamic oscillatory testing (e.g., frequency of 10 Hz and pressure of 5 Pa) with a rheometer having a cone plate configuration.

The conductivity of the working electrolyte is high and typically ranges from about 5 to about 100 milliSiemens per centimeter ("mS/cm"), in some embodiments from about 10 to about 80 mS/cm, in some embodiments from about 15 mS/cm to about 70 mS/cm, and in some embodiments, from about 20 to about 60 mS/cm, determined at a temperature of 25° C. using any known electric conductivity meter (e.g., Oakton Con Series 11). Within the ranges noted, the electric field is strong as the dielectric but can extend into the electrolyte to a length (Debye length) sufficient to result in significant charge separation. This extends the potential energy of the dielectric to the electrolyte so that the resulting capacitor is able to store even more potential energy than predicted by the thickness of the dielectric. In other words, the capacitor may be charged to a voltage that is close to or even exceeds the formation voltage of the dielectric. The ratio of the voltage to which the capacitor can be charged to the formation voltage may, for instance, be from about 0.80 to about 2.00, and in some embodiments, from about 0.85 to about 1.50, and in some embodiments, from about 0.86 to about 1.20. As an example, the voltage to which the capacitor is charged may be from about 150 volts to about 300 volts, in some embodiments from about 180 volts to about 260 volts, and in some embodiments, from about 200 volts to about 240 volts. The formation voltage may likewise range from about from about 180 volts to about 320 volts, in some embodiments from about 200 volts to about 280 volts, and in some embodiments, from about 220 volts to about 250 volts. The working electrolyte is also neutral and thus has a pH value of from about 5.0 to about 8.0, in some embodiments from about 5.5 to about 7.5, and in some embodiments, from about 6.0 to about 7.0. Among other things, such a pH may enhance the ability of hydrogen ions present in an aqueous electrolyte to interact with the cathode material to achieve maximum capacitance and thus energy density.

To achieve the combination of high conductivity and a neutral pH value, the working electrolyte contains a combination of the ammonium salt, inorganic oxide particles, acid, and solvent system in certain concentrations. The nature and concentration of these components are selectively controlled to help achieve the desired electrical properties for the capacitor. In this regard, various embodiments of the components of the electrolyte will now be described in greater detail below.

A. Ammonium Salt

The organic acid used to form the ammonium salt may be "weak" in the sense that it typically has a first acid dissociation constant ($pK_{a1}$) of about 0 to about 11, in some embodiments about 1 to about 10, and in some embodiments, from about 2 to about 10, determined at 25° C. Any suitable weak organic acid may be used in the present invention, such as carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid (e.g., dextotartaric acid, mesotartaric acid, etc.), citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; blends thereof, and so forth. Polyprotic acids (e.g., diprotic, triprotic, etc.) are particularly desirable for use in forming the salt, such as adipic acid ($pK_{a1}$ of 4.43 and $pK_{a2}$ of 5.41), α-tartaric acid ($pK_{a1}$ of 2.98 and $pK_{a2}$ of 4.34), mesotartaric acid ($pK_{a1}$ of 3.22 and $pK_{a2}$ of 4.82), oxalic acid ($pK_{a1}$ of 1.23 and $pK_{a2}$ of 4.19), lactic acid ($pK_{a1}$ of 3.13, $pK_{a2}$ of 4.76, and $pK_{a3}$ of 6.40), etc. While the actual amounts may vary depending on the particular type of salt employed, its solubility in the solvent system, and the presence of other components, ammonium salts are typically present in the electrolyte in an amount of from about 1 to about 40 wt. %, in some embodiments from about 5 to about 35 wt. %, in some embodiments from about 10 to about 30 wt. %, and in some embodiments, from about 15 to about 25 wt. %.

B. Acid

One or more acids are also employed to help achieve the desired pH and conductivity values. Suitable acids may include, for instance, inorganic acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, ethylenediaminetetraacetic acid ("EDTA"), glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. EDTA may be particularly suitable for use in the present invention as it not only can reduce the pH value of the electrolyte, but it can also serve as a sequestering agent for any metallic impurities that may be present in the particles.

Although the total concentration of acids may vary, they are typically present in an amount of from about 0.01 wt. % to about 10 wt. %, in some embodiments from about 0.05 wt. % to about 5 wt. %, and in some embodiments, from about 0.1 wt. % to about 2 wt. % of the electrolyte. In one particular embodiment, a mixture of different acids may be employed, such as mixture of an inorganic and an organic acid. In such embodiments, inorganic acids (e.g., phosphoric acid) may constitute from about 0.005 wt. % to about 5 wt. %, in some embodiments from about 0.01 wt. % to about 3 wt. %, and in some embodiments, from about 0.05 wt. % to about 1 wt. % of the electrolyte, and organic acids (e.g., EDTA) may likewise constitute from about 0.005 wt. % to about 5 wt. %, in some embodiments from about 0.01 wt. % to about 3 wt. %, and in some embodiments, from about 0.05 wt. % to about 1 wt % of the electrolyte.

C. Aqueous Solvent System

The electrolyte is aqueous in that it contains an aqueous solvent, such as water (e.g., deionized water). For example, water (e.g., deionized water) may constitute from about 20 wt. % to about 95 wt. %, in some embodiments from about 30 wt. % to about 90 wt. %, and in some embodiments, from about 40 wt. % to about 85 wt. % of the electrolyte. A secondary solvent may also be employed to form a solvent mixture. Suitable secondary solvents may include, for instance, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); and so forth. Such mixtures typically contain water in an amount from about 40 wt. % to about 80 wt. %, in some embodiments from about 50 wt. % to about 75 wt. %, and in some embodiments, from about 60 wt. % to about 70 wt. % of the solvent system and secondary solvents in an amount from about 20 wt. % to about 60 wt. %, in some embodiments from about 25 wt. % to about 50 wt. %, and in some embodiments, from about 30 wt. % to about 40 wt. % of the solvent system. Likewise, when such mixtures are employed, water typically constitutes from about 30 wt. % to about 70 wt. %, in some embodiments from about 35 wt. % to about 65 wt. %, and in some embodiments, from about 40 wt. % to about 60 wt. % of the electrolyte and secondary solvents may constitute from about 5 wt. % to about 40 wt. %, in some embodiments from about 10 wt. % to about 35 wt. %, and in some embodiments, from about 15 wt. % to about 30 wt. % of the electrolyte.

D. Inorganic Oxide Particles

As indicated above, inorganic oxide particles are also employed in the electrolyte to form a gel having a certain desired viscosity. The amount of particles in the electrolyte may vary depending on the degree of gelation required, as well as the particular nature and concentration of other components in the electrolyte. Typically, however, inorganic oxide particles constitute from about 0.5 wt. % to about 20 wt. %, in some embodiments from about 1 wt. % to about 15 wt. %, and in some embodiments, from about 1.5 wt. % to about 10 wt. % of the electrolyte.

The particles may possess various forms, shapes, and sizes depending upon the desired result. For instance, the particles may be in the shape of a sphere, crystal, rod, disk, tube, string, etc. The average size of the particles may be less than about 1,000 nanometers, in some embodiments from about 1 to about 500 nanometers, in some embodiments from about 2 to about 200 nanometers, and in some embodiments, from about 4 to about 50 nanometers. As used herein, the average size of a particle refers to its average length, width, height, and/or diameter. The particles also typically have a high specific surface area, such as from about 50 square meters per gram ($m^2/g$) to about 1000 $m^2/g$, in some embodiments from about 100 $m^2/g$ to about 600 $m^2/g$, and in some embodiments, from about 150 $m^2/g$ to about 400 $m^2/g$. The term "specific surface area" generally refers to surface area as determined by the physical gas adsorption (B.E.T.) method of Bruanauer, Emmet, and Teller, Journal of American Chemical Society, Vol. 60, 1938, p. 309, with nitrogen as the adsorption gas. The test may be conducted with a MONOSORB® Specific Surface Area Analyzer available from QUANTACHROME Corporation, Syosset, N.Y., which measures the quantity of adsorbate nitrogen gas adsorbed on a solid surface by sensing the change in thermal conductivity of a flowing mixture of adsorbate and inert carrier gas (e.g., helium). In addition, the particles may also be relatively nonporous or solid. That is, the particles may have a pore volume that is less than about 0.5 milliliters per gram (ml/g), in some embodiments less than about 0.4 milliliters per gram, in some embodiments less than about 0.3 ml/g, and in some embodiments, from about 0.2 ml/g to about 0.3 ml/g. Without intending to be limited by theory, it is believed that particles having such a small size, high surface area, and solid nature may improve the gelation rate and enhance the uniformity and stability of the resulting suspension.

The inorganic oxide particles may be formed from a variety of materials, including, but not limited to, silica, alumina, zirconia, magnesium oxide, titanium dioxide, iron oxide, zinc oxide, copper oxide, etc., as well as combinations thereof. The particles may be formed using a fumed process, precipitation, etc. Due to their higher surface area and smaller particle size, however, fumed particles are particularly suitable for use in the present invention. Fumed silica, for instance, is amorphous $SiO_2$ that can be produced by vapor phase hydrolysis of silicon tetrachloride in a hydrogen oxygen flame. Three-dimensional branched chain aggregates are produced in the flame from fusion of the primary particles. During cooling, these aggregates agglomerate into a fine powder having a particle size within the ranges noted above. Fumed silica possesses silanol groups that can react under acidic conditions to form a cross-linked network. The resulting siloxane cross-linkage is a compound of silicon and oxygen in which each atom of silicon is bonded to four oxygen atoms, forming a tetrahedral structure, in a manner analogous to the bonding of carbon to hydrogen in methane, the bonds being of about the same strength in each case. This structure is found in the dioxide and in silicates generally, where the $SiO_4$ groups occur in chains or rings. By creating siloxane cross-linkages, a gel is formed that entraps the liquid phase of the electrolyte. Commercially suitable fumed silica particles may, for instance, include those available from Cabot Corporation under the designation CAB-O-SIL®.

E. Other Additives

The working electrolyte may also contain other components that help improve the electrical performance of the capacitor. For instance, a depolarizer may be employed in the electrolyte to help inhibit the evolution of hydrogen gas at the cathode of the electrolytic capacitor, which could otherwise cause the capacitor to bulge and eventually fail. When employed, the depolarizers normally constitute from about 0.01 wt. % to about 5 wt. %, in some embodiments from about 0.05 wt. % to about 2 wt. %, and in some embodiments, from about 0.1 wt. % to about 1 wt. % of the electrolyte. Suitable depolarizers may include nitroaromatic compounds, such as 2-nitrophenol, 3-nitrophenol, 4-nitrophenol, 2-nitrobenzonic acid, 3-nitrobenzonic acid, 4-nitrobenzonic acid, 2-nitroacetophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and so forth. Particularly suitable nitroaromatic depolarizers for use in the present invention are nitrobenzoic acids, anhydrides or salts thereof, substituted with one or more alkyl groups (e.g., methyl, ethyl, propyl, butyl, etc). Specific examples of such alkyl-substituted nitrobenzoic compounds include, for instance, 2-methyl-3-nitrobenzoic acid; 2-methyl-6-nitrobenzoic acid; 3-methyl-2-nitrobenzoic acid; 3-methyl-4-nitrobenzoic acid; 3-methyl-6-nitrobenzoic acid; 4-methyl-3-nitrobenzoic acid; anhydrides or salts thereof; and so forth.

The components of the electrolyte can be combined together in a variety of different ways, either before and/or after their incorporation into the capacitor. In one particular embodiment, the electrolyte may be gelled before it is placed into contact with the anode and/or cathode. For example, when the components of the electrolyte are initially combined together, the electrolyte may be in the form of a sol that contains particles as a disperse phase. However, such sols can be catalyzed to induce gelation by several methods. Examples include adjusting the pH and/or temperature of the sol to a point where gelation occurs. Alternatively, the sol may be subjected to a controlled form of energy (e.g., heat, ultrasonic, ultraviolet light, electron beam radiation, etc.) to induce gelation. The use of ultrasonic energy (e.g., ultrasonic probes) is particularly desirable as it minimizes the need to alter the pH or temperature of the electrolyte.

Once gelled, the electrolyte can be incorporated into the capacitor in a variety of different ways. In one embodiment, for example, the electrolyte is simply added to the capacitor after the anode and cathode are positioned in the desired configuration. This may be accomplished, for instance, using a fill port. The anode may also be pre-impregnated with the gelled electrolyte, such as by dipping the anode into the electrolyte before it is placed into the capacitor. Impregnation of the anode with the gelled electrolyte can further enhance the degree of contact between the anode and the electrolyte. In either case, the present inventors have surprisingly discovered that the electrolyte can have a low initial viscosity and flowability so that it can be precisely incorporated into the capacitor. For example, the gel may have an initial viscosity (e.g., 1 hour or less after gelation is initiated) within the range of from about 1 to about 40 centipoise, in some embodiments from about 2 to about 30 centipoise, and in some embodiments, from about 3 to about 10 centipoise, as determined using a Brookfield LVT viscometer (spindle #3 at 60 rpm) at a temperature of 25° C. Likewise, the gel may have an initial phase angle δ of from about 50° to 90°, in some embodiments from about 60° to 90°, and in some embodiments, from about 80° to 90°, as well as an initial storage modulus G' of about 1 kilopascal or less, in some embodiments about 0.1 kilopascals or less, and in some embodiments, from 0 to about 0.01 kilopascals.

After incorporation into the capacitor, however, the electrolyte may continue to gel until the viscosity is raised, such as to a viscosity, phase angle δ, and/or storage modulus G' within the target ranges noted above. This "semi-solid" or "solid" transition may occur relatively after gelation is induced, such as from about 1 to about 100 hours, in some embodiments from about 10 to about 80 hours, and in some embodiments, from about 20 to about 60 hours. The transition may also occur before and/or after the anode is incorporated into the capacitor and placed in contact with the cathode. If desired, an additional "fill" electrolyte may be added to ensure that good electrical contact exists between the impregnated anode and the cathode. This fill electrolyte may be formed in accordance with the present invention, or it may be formed from other known components.

II. Cathode

The cathode contains at least one substrate that is coated with a conductive polymer. The substrate may be include a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. Titanium and tantalum, as well as alloys thereof, are particularly suitable for use in the present invention. The geometric configuration of the substrate may generally vary as is well known to those skilled in the art, such as in the form of a container, can, foil, sheet, screen, mesh, etc. In one embodiment, for example, the metal substrate forms a casing having a generally cylindrical shape. It should be understood, however, that any geometric configuration may be employed in the present invention, such as D-shaped, rectangular, triangular, prismatic, etc. The casing may optionally include a lid that covers the anode and electrolyte, which may be formed from the same or different material than the casing.

The substrate may be roughened to increase its surface area and increase the degree to which the conductive polymer may be able to adhere thereto. In one embodiment, for example, the surface is chemically etched, such as by applying a solution of a corrosive substance (e.g., hydrochloric acid) to the surface. The surface may also be electrochemically etched, such as by applying a voltage to a solution of the corrosive substance so that it undergoes electrolysis. The voltage may be raised to a sufficiently high level to initiate "sparking" at the surface of the substrate, which is believed to create high local surface temperatures sufficient that etches away the substrate. This technique is described in more detail in U.S. Patent Application Publication No. 2010/0142124 to Dreissig, et al. In addition to chemical or electrochemical roughening techniques, mechanical roughening may also be employed. In one embodiment, for instance, the surface of the metal substrate may be abrasive blasted by propelling a stream of abrasive media (e.g., sand) against at least a portion of a surface thereof.

The conductive polymer coating may be formed from one or more layers.

The material employed in such layer(s) may vary. In one embodiment, for example, the material includes conductive polymer(s) that are typically π-conjugated and have electrical conductivity after oxidation or reduction. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Substituted polythiophenes are particularly suitable for use as conductive polymer in that they have particularly good mechanical robustness and electrical performance. In one particular embodiment, the substituted polythiophene has the following general structure:

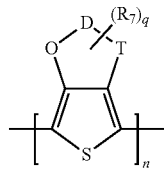

wherein,
T is O or S;
D is an optionally substituted $C_1$ to $C_5$ alkylene radical (e.g., methylene, ethylene, n-propylene, n-butylene, n-pentylene, etc.);
$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and
q is an integer from 0 to 8, in some embodiments, from 0 to 2, and in one embodiment, 0; and
n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

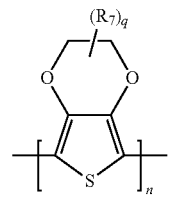

Methods for forming conductive polymers, such as described above, are well known in the art. For instance, U.S. Pat. No. 6,987,663 to Merker, et al. describes various techniques for forming substituted polythiophenes from a monomeric precursor. The monomeric precursor may, for instance, have the following structure:

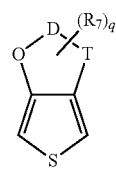

wherein,
T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

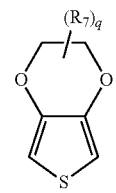

wherein, $R_7$ and q are as defined above. In one particular embodiment, "q" is 0. One commercially suitable example of 3,4-ethylenedioxythiophene is available from Heraeus Clevios under the designation Clevios™ M. Other suitable monomers are also described in U.S. Pat. Nos. 5,111,327 to Blohm, et al. and 6,635,729 to Groenendaal, et al. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

The thiophene monomers may be chemically polymerized in the presence of an oxidative catalyst. The oxidative catalyst typically includes a transition metal cation, such as iron(III), copper(II), chromium(VI), cerium(IV), manganese(IV), manganese(VII), ruthenium(III) cations, etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst employed in the precursor solution may have both a catalytic and doping functionality in that it includes a cation (e.g., transition metal) and anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Clevios under the designation Clevios™ C.

Various methods may be utilized to form a conductive polymer layer. In one embodiment, the oxidative catalyst and monomer are applied, either sequentially or together, such that the polymerization reaction occurs in situ on the substrate. Suitable application techniques may include screen-printing, dipping, electrophoretic coating, and spraying, may be used to form a conductive polymer coating. As an example, the monomer may initially be mixed with the oxidative catalyst to form a precursor solution. Once the mixture is formed, it may be applied to the substrate and then allowed to polymerize so that the conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The substrate may then be dried to remove the solvent therefrom. Thereafter, the substrate may be dipped into a solution containing the monomer. Polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al.

In addition to in situ application, a conductive polymer layer may also be applied in the form of a dispersion of conductive polymer particles. Although their size may vary, it is typically desired that the particles possess a small diameter to increase the surface area available for adhering to the substrate. For example, the particles may have an average diameter of from about 1 to about 500 nanometers, in some embodiments from about 5 to about 400 nanometers, and in some embodiments, from about 10 to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

If desired, one or more of the above-described application steps may be repeated until the desired thickness of the coating is achieved. In some embodiments, only a relatively thin layer of the coating is formed at a time. The total target thickness of the coating may generally vary depending on the desired properties of the capacitor. Typically, the resulting conductive polymer coating has a thickness of from about 0.2 micrometers ("μm") to about 50 μm, in some embodiments from about 0.5 μm to about 20 μm, and in some embodiments, from about 1 μm to about 5 μm. It should be understood that the thickness of the coating is not necessarily the same at all locations on the substrate. Nevertheless, the average thickness of the coating on the substrate generally falls within the ranges noted above.

The conductive polymer layer may optionally be healed. Healing may occur after each application of a conductive polymer layer or may occur after the application of the entire coating. In some embodiments, the conductive polymer can be healed by dipping the part into an electrolyte solution, and thereafter applying a constant voltage to the solution until the current is reduced to a preselected level. If desired, such healing can be accomplished in multiple steps. For example, an electrolyte solution can be a dilute solution of the monomer, the catalyst, and dopant in an alcohol solvent (e.g., ethanol). The coating may also be washed if desired to remove various byproducts, excess reagents, and so forth.

III. Anode

The anode is typically formed from a valve metal composition. The specific charge of the composition may vary, such as from about 2,000 μF*V/g to about 80,000 μF*V/g, in some embodiments from about 5,000 μF*V/g to about 40,000 μF*V/g or more, and in some embodiments, from about 10,000 to about 20,000 μF*V/g. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. The niobium oxide may be $NbO_{0.7}$, $NbO_{1.0}$, $NbO_{1.1}$, and $NbO_2$. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; 6,592,740 to Fife, et al.; and U.S. Pat. No. 6,639,787 to Kimmel, et al.; and U.S. Pat. No. 7,220, 397 to Kimmel, et al., as well as U.S. Patent Application Publication Nos. 2005/0019581 to Schnitter; 2005/0103638 to Schnitter, et al.; 2005/0013765 to Thomas, et al.

To form the anode, a powder of the valve metal composition is generally employed. The powder may contain particles any of a variety of shapes, such as nodular, angular, flake, etc., as well as mixtures thereof. Particularly suitable powders are tantalum powders available from Cabot Corp. (e.g., C255 flake powder, TU4D flake/nodular powder, etc.) and H.C. Starck (e.g., NH175 nodular powder). The valve metal composition may be formed using techniques known to those skilled in the art. A precursor tantalum powder, for instance, may be formed by reducing a tantalum salt (e.g., potassium fluotantalate ($K_2TaF_7$), sodium fluotantalate ($Na_2TaF_7$), tantalum pentachloride ($TaCl_5$), etc.) with a reducing agent (e.g., hydrogen, sodium, potassium, magnesium, calcium, etc.). The precursor powder may initially contain particles in a granular form, which can then be deformed or flattened into a flake morphology using known techniques. One technique for reducing the thickness of the particles includes subjecting the powder to a mechanical milling process that grinds the particles into a smaller size. Any of a variety of milling techniques may be utilized in the present invention to achieve the desired particle characteristics. For example, the powder may be dispersed in a fluid medium (e.g., ethanol, methanol, fluorinated fluid, etc.) to form a slurry. The slurry may then be combined with a grinding media (e.g., metal balls, such as tantalum) in a mill. The number of grinding media may generally vary depending on the size of the mill, such as from about 100 to about 2000, and in some embodiments from about 600 to about 1000. The starting powder, the fluid medium, and grinding media may be combined in any proportion. For example, the ratio of the starting valve metal powder to the grinding media may be from about 1:5 to about 1:50. Likewise, the ratio of the volume of the fluid medium to the combined volume of the starting valve metal powder may be from about 0.5:1 to about 3:1, in some embodiments from about 0.5:1 to about 2:1, and in some embodiments, from about 0.5:1 to about 1:1. Some examples of mills that may be used in the present invention are described in U.S. Pat. Nos. 5,522,558; 5,232,169; 6,126,097; and 6,145,765.

Milling may occur for any predetermined amount of time needed to achieve the target specific surface area. For example, the milling time may range from about 30 minutes to about 40 hours, in some embodiments, from about 1 hour to about 20 hours, and in some embodiments, from about 5 hours to about 15 hours. Milling may be conducted at any desired temperature, including at room temperature or an elevated temperature. After milling, the fluid medium may be separated or removed from the powder, such as by air-drying, heating, filtering, evaporating, etc. For instance, the powder may optionally be subjected to one or more acid leaching steps to remove metallic impurities. Such acid leaching steps are well known in the art and may employ any of a variety of acids, such as mineral acids (e.g., hydrochloric acid, hydrobromic acid, hydrofluoric acid, phosphoric acid, sulfuric acid, nitric acid, etc.), organic acids (e.g., citric acid, tartaric acid, formic acid, oxalic acid, benzoic acid, malonic acid, succinic acid, adipic acid, phthalic acid, etc.); and so forth.

Although not required, the powder may be agglomerated using any technique known in the art. Such powders may be agglomerated in a variety of ways, such as through one or multiple heat treatment steps at a temperature of from about 700° C. to about 1400° C., in some embodiments from about 750° C. to about 1200° C., and in some embodiments, from about 800° C. to about 1100° C. Heat treatment may occur in an inert or reducing atmosphere. For example, heat treatment may occur in an atmosphere containing hydrogen or a hydrogen-releasing compound (e.g., ammonium chloride, calcium hydride, magnesium hydride, etc.) to partially sinter the powder and decrease the content of impurities (e.g., fluorine). If desired, agglomeration may also be performed in the presence of a getter material, such as magnesium. After thermal treatment, the particles may be passivated by the gradual admission of air. Other suitable agglomeration techniques are also described in U.S. Pat. No. 6,576,038 to Rao; U.S. Pat. No. 6,238,456 to Wolf, et al.; U.S. Pat. No. 5,954,856 to Pathare, et al.; U.S. Pat. No. 5,082,491 to Rerat; U.S. Pat. No. 4,555,268 to Getz; U.S. Pat. No. 4,483,819 to Albrecht, et al.; U.S. Pat. No. 4,441,927 to Getz, et al.; and U.S. Pat. No. 4,017,302 to Bates, et al.

Regardless of the particular method employed, the resulting powder may possess certain characteristics that enhance its ability to be formed into a capacitor anode. For example, the particles employed in the anode may be generally flat. The degree of flatness is generally defined by the "aspect ratio", i.e., the average diameter or width of the particles divided by the average thickness ("D/T"). For example, the aspect ratio of the particles may be from about 2 to about 100, in some embodiments from about 3 to about 50, in some embodiments, from about 4 to about 30. The particles may also have a specific surface area of from about 0.5 to about 10.0 $m^2/g$, in some embodiments from about 0.7 to about 5.0 $m^2/g$, and in some embodiments, from about 1.0 to about 4.0 $m^2/g$. The term "specific surface area" is defined in more detail above. The bulk density (also known as Scott density) is also typically from about 0.1 to about 2 grams per cubic centimeter ($g/cm^3$), in some embodiments from about 0.2 $g/cm^3$ to about 1.5 $g/cm^3$, and in some embodiments, from about 0.4 $g/cm^3$ to about 1 $g/cm^3$. "Bulk density" may be determined using a flow meter funnel and density cup. More specifically, the sample may be poured through the funnel into the cup until the sample completely fills and overflows the periphery of the cup, and thereafter sample may be leveled-off by a spatula, without jarring, so that it is flush with the top of the cup. The leveled sample is transferred to a balance and weighed to the nearest 0.1 gram to determine the density value. Such an apparatus is commercially available from Alcan Aluminum Corp. of Elizabeth, N.J. The particles may also have an average size (e.g., width) of from about 0.1 to about 100 micrometers, in some embodiments from about 0.5 to about 70 micrometers, and in some embodiments, from about 1 to about 50 micrometers.

To facilitate the construction of the anode, certain additional components may also be included in the powder. For example, the powder may be optionally mixed with a binder and/or lubricant to ensure that the particles adequately adhere to each other when pressed to form the anode body. Suitable binders may include, for instance, poly(vinyl butyral); poly (vinyl acetate); poly(vinyl alcohol); poly(vinyl pyrrolidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly(lower alkyl methacrylates) and copolymers of lower alkyl acrylates and methacrylates; and fatty acids and waxes, such as stearic and other soapy fatty acids, vegetable wax, microwaxes (purified paraffins), etc. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and/or lubricants are not necessarily required in the present invention.

The resulting powder may be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead wire. The wire may be formed from any electrically conductive material, such as tantalum, niobium, aluminum, hafnium, titanium, etc., as well as electrically conductive oxides and/or nitrides of thereof.

Any binder/lubricant may be removed after pressing by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al. Thereafter, the pellet is sintered to form a porous, integral mass. The present inventors have discovered that certain sintering conditions can result in an increase in the specific charge of the resulting anode, as well increase in the breakdown voltage of the resulting capacitor. More particularly, the pellet is typically sintered at a temperature of from about 800° C. to about 2000° C., in some embodiments from about 1200° C. to about 1800° C., and in some embodiments, from about 1500° C. to about 1700° C., for a time of from about 5 minutes to about 100 minutes, and in some embodiments, from about 8 minutes to about 15 minutes. This may occur in one or more steps. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed. When employed, flake particles may be better able to withstand the high sintering temperatures and prolonged sintering times often employed in forming the anode, and produce a porous sintered body with low shrinkage and a large specific surface area.

Upon sintering, the pellet shrinks due to the growth of metallurgical bonds between the particles. Because shrinkage generally increases the density of the pellet, lower press densities ("green") may be employed to still achieve the desired target density. For example, the target density of the pellet after sintering is typically from about 5 to about 8 grams per cubic centimeter. As a result of the shrinking phenomenon, however, the pellet need not be pressed to such high densities, but may instead be pressed to densities of less than about 6.0 grams per cubic centimeter, and in some embodiments, from about 4.5 to about 5.5 grams per cubic centimeter. Among other things, the ability to employ lower green densities may provide significant cost savings and increase processing efficiency. It should be understood that the pressed density may not always be uniform across the pellet, particularly if compression occurs in a direction perpendicular to the longitudinal axis of the wire. Namely, the pressed density is determined by dividing the amount of material by the volume of the pressed pellet. The volume of the pellet is directly proportional to the compressed length in the direction perpendicular to the longitudinal axis of the wire. The density is inversely proportional to the compressed length. Thus, the compressed length is actually lower at those locations adjacent to the wire than the remaining locations of the pellet. The pressed density is likewise greater at those locations adjacent to the wire. For example, the density of the pellet at those locations adjacent to the wire is typically at least about 10% greater, and in some cases, at least about 20% greater than the pressed density of the pellet at the remaining locations of the pellet.

Figure 2:
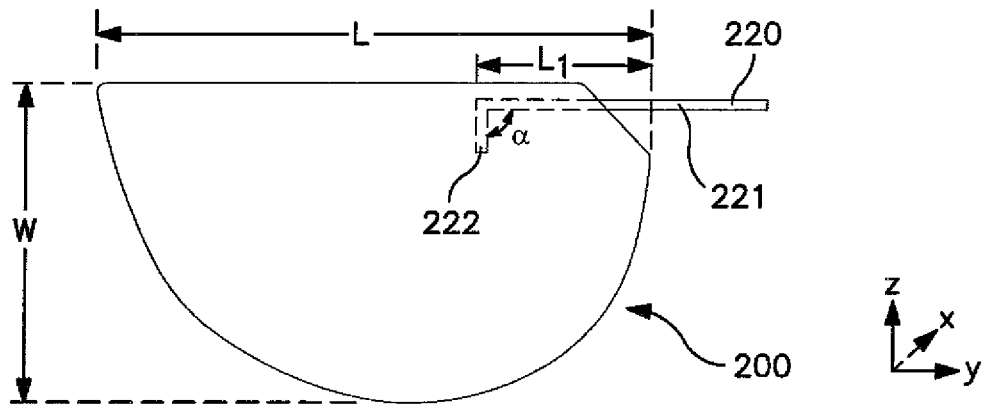
FIG. 2 is a top view of embodiment of an anode that may be employed in the capacitor of the present invention.
Figure 3:
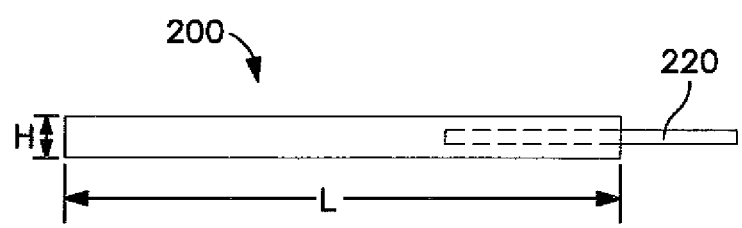
FIG. 3 is a frontal view of the anode of FIG. 2.

Due to the thin nature of the planar anode, it is sometimes desirable to control the manner in which the anode wire is inserted to limit the extent that stresses applied during manufacturing will cause the wire to pull out of the anode. For example, in one embodiment, at least a portion of the wire within the anode is bent at an angle relative to the longitudinal axis of the wire. This "bend" reduces the ease to which the wire can be pulled out in the longitudinal direction after the anode is pressed and sintered. Referring to FIGS. 2-3, for example, one embodiment of a planar anode 200 is shown that contains an anode wire 220. The anode wire contains a first portion 221 that extends in a longitudinal direction ("y" direction) from the anode 200. Within the body of the anode, the wire 200 also contains a second portion 222 that is bent at an angle "α" relative to the first portion 221. The angle "α" is typically from about 40° to about 120°, in some embodiments from about 60° to about 110°, and in some embodiments, from about 80° to about 100° (e.g., about 90°). Such a bent configuration may be achieved in a variety of different ways. For example, in one embodiment, a press mold may be partially filled with the powder, and then a "pre-bent" anode wire may be inserted into the press mold. Thereafter, the mold may be filled with powder and the entire assembly compressed into a pellet.

In addition to its geometric configuration, the extent to which the anode wire is inserted into the anode may also be controlled to help minimize the likelihood of withdrawal during manufacturing. That is, the wire is less likely to be pulled out of the anode the farther it is inserted. Of course, too great of a wire insertion can alter the uniformity of the press density, which can impact the resulting electrical performance of the anode. In this regard, the present inventors have discovered that the ratio of the length of the anode in which the wire is inserted to the entire length of the anode is typically from about 0.1 to about 0.6, and in some embodiments, from about 0.2 to about 0.5. In FIG. 2, for example, the length "$L_1$" represents the length of the anode 200 in which the anode wire 220 is inserted, while the length "L" represents the entire length of the anode 200. In certain cases, the length "L" of the anode 200 may range from about 1 to about 80 millimeters, in some embodiments from about 10 to about 60 millimeters, and in some embodiments, from about 20 to about 50 millimeters. Likewise, the length "$L_1$" may be from about 1 to about 40 millimeters, in some embodiments, from about 2 to about 20 millimeters, and in some embodiments, from about 5 to about 15 millimeters. The width "W" of the anode may also be from about 0.05 to about 40 millimeters, in some embodiments, from about 0.5 to about 25 millimeters, and in some embodiments, from about 2 to about 10 millimeters.

The thickness of the anode is generally small to improve the electrical performance and volumetric efficiency of the resulting capacitor. In FIG. 3, for example, the thickness of a planar anode 200 is represented by the dimension "H." Typically, the thickness of the anode is about 5 millimeters or less, in some embodiments, from about 0.05 to about 4 millimeters, and in some embodiments, from about 0.1 to about 3.5 millimeters. The ratio of the length of the anode to the thickness of the anode is from about 5 to about 50, in some embodiments from about 6 to about 30, and in some embodiments, from about 7 to about 20. Although shown as a "D-shape" in FIG. 2, it should also be understood that the anode may possess any other desired shape, such as square, rectangle, circle, oval, triangle, etc. Polygonal shapes having more than four (4) edges (e.g., hexagon, octagon, heptagon, pentagon, etc.) are particularly desired due to their relatively high surface area.

The anode also contains a dielectric formed by anodically oxidizing ("anodizing") the sintered anode so that a dielectric layer is formed over and/or within the anode. For example, a tantalum (Ta) anode may be anodized to tantalum pentoxide ($Ta_2O_5$). Typically, anodization is performed by initially applying a solution to the anode, such as by dipping anode into the electrolyte. Aqueous solvents (e.g., water) and/or non-aqueous solvents (e.g., ethylene glycol) may be employed. To enhance conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The temperature of the anodizing solution may range from about 10° C. to about 200° C., in some embodiments from about 20° C. to about 150° C., and in some embodiments, from about 30° C. to about 100° C. The resulting dielectric layer may be formed on a surface of the anode and within its pores. When employed, the specific nature of the powder may allow the resulting anode to achieve a high specific charge even at the high formation voltages often employed in the present invention. For example, within the ranges noted above, the anode may still be able to a specific charge of from about 2,000 µF*V/g to about 20,000 µF*V/g, in some embodiments from about 5,000 µF*V/g to about 15,000 µF*V/g or more, and in some embodiments, from about 8,000 to about 12,000 µF*V/g.

Figure 4:
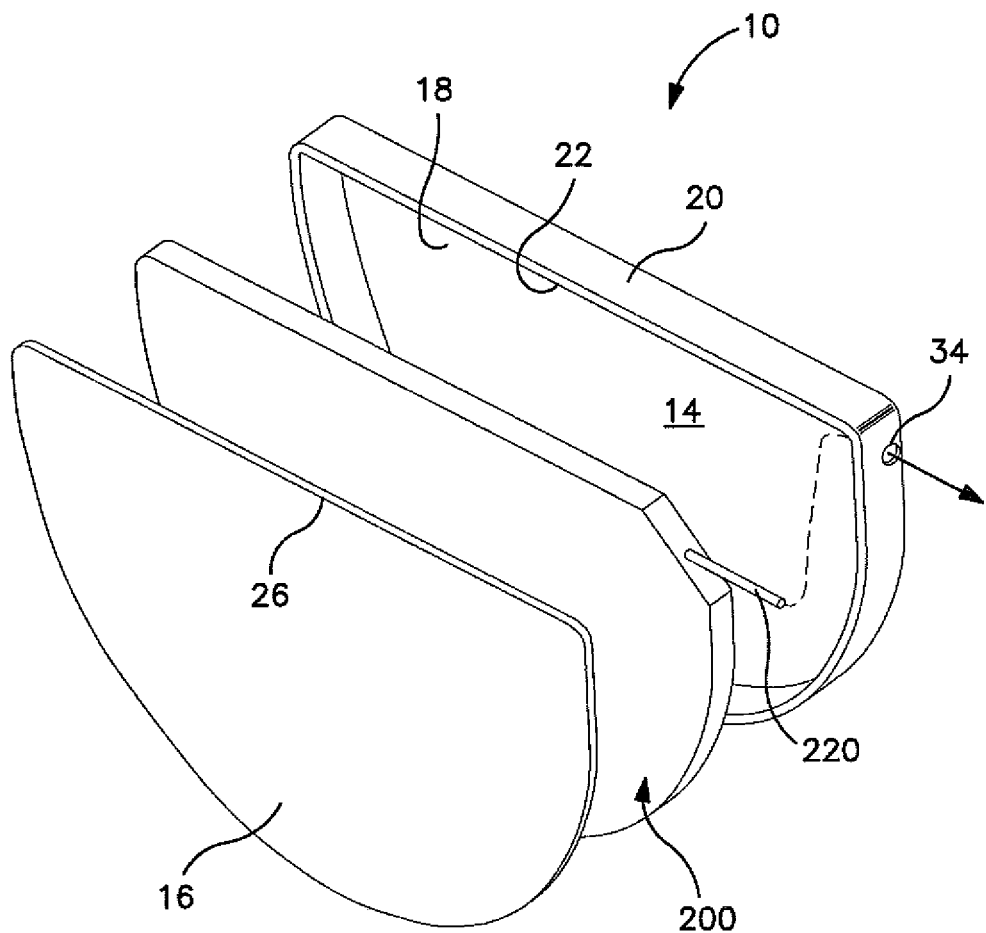
FIG. 4 is a perspective view illustrating the assembly of the anode of FIG. 2 with casing components to form the capacitor shown in FIG. 1.

The particular manner in which the components are incorporated into the capacitor is not critical and may be accomplished using a variety of techniques. In most embodiments, however, the anode is positioned within a casing. Referring to FIGS. 1 and 4, for example, one embodiment of a capacitor 10 is shown that includes the anode 200 shown in FIGS. 2-3. Although only one anode is shown, it should be understood that multiple anodes (e.g., stack) may be employed as is described, for instance, in U.S. Pat. No. 7,483,260 to Ziarniak, et al. In the illustrated embodiment, the anode 200 may be positioned within a casing 12 made of a first casing member 14 and a second casing member 16. The first casing member 14 has a sidewall 18 joined to a surrounding sidewall 20 extending to an edge 22. The second casing member 16 is in the shape of a plate and contains a second face wall 24 having a surrounding edge 26. The casing members 14 and 16 may be hermetically sealed together by welding (e.g., laser welding) the overlapping edges 22 and 26 where the contact each other. The casing members 14 and/or 16 may be analogous to the metal substrate described above such that a conductive polymer coating (not shown) may be deposited on the interior surface thereof. Alternatively, a separate metal substrate may be located adjacent to the casing member 14 and/or 16 and applied with the conductive polymer coating.

Although not shown, one or more separators may be employed that help insulate the anode and conductive polymer-coated cathode from each other. Examples of suitable materials for this purpose include, for instance, porous polymer materials (e.g., polypropylene, polyethylene, etc.), porous inorganic materials (e.g., fiberglass mats, porous glass paper, etc.), ion exchange resin materials, etc. Particular examples include ionic perfluoronated sulfonic acid polymer membranes (e.g., Nafion™ from the E.I. DuPont de Nemeours & Co.), sulphonated fluorocarbon polymer membranes, polybenzimidazole (PBI) membranes, and polyether ether ketone (PEEK) membranes. Although preventing direct contact between the anode and cathode, the separator permits ionic current flow of the electrolyte to the electrodes.

A feedthrough 30 may also be employed that electrically insulates the anode wire 200 from the casing 12. The feedthrough 30 extends from within the casing 12 to the outside thereof. A hole 34 may be provided in the surrounding sidewall 20 of the casing member 14 into which the feedthrough 30. The feedthrough 30 may, for example, be a glass-to-metal seal ("GTMS") that contains a ferrule (not shown) with an internal cylindrical bore of a constant inside diameter. An insulative glass can thus provide a hermetic seal between the bore and the anode wire 200 passing therethrough. After assembly and sealing (e.g., welding), the electrolyte may optionally be introduced into the casing through a fill-port. Filling may be accomplished by placing the capacitor in a vacuum chamber so that the fill-port extends into a reservoir of the electrolyte. When the chamber is evacuated, pressure is reduced inside the capacitor. When the vacuum is released, pressure inside the capacitor re-equilibrates, and the electrolyte is drawn through the fill-port into the capacitor.

Regardless of its particular configuration, the capacitor of the present invention may exhibit excellent electrical properties. For example, the capacitor may exhibit a high volumetric efficiency, such as from about 50,000 µF*V/cm³ to about 300,000 µF*V/cm³, in some embodiments from about 60,000 µF*V/cm³ to about 200,000 µF*V/cm³, and in some embodiments, from about 80,000 µF*V/cm³ to about 150,000 µF*V/cm³, determined at a frequency of 120 Hz and at room temperature (e.g., 25° C.). Volumetric efficiency is determined by multiplying the formation voltage of a part by its capacitance, and then dividing by the product by the volume of the part. For example, a formation voltage may be 175 volts for a part having a capacitance of 520 µF, which results in a product of 91,000 µF*V. If the part occupies a volume of about 0.8 cm³, this results in a volumetric efficiency of about 113,750 µF*V/cm³.

The capacitor may also exhibit a high energy density that enables it suitable for use in high pulse applications. Energy density is generally determined according to the equation $E=\frac{1}{2}*CV^2$, where C is the capacitance in farads (F) and V is the working voltage of capacitor in volts (V). The capacitance may, for instance, be measured using a capacitance meter (e.g., Keithley 3330 Precision LCZ meter with Kelvin Leads, 2 volts bias and 1 volt signal) at operating frequencies of from 10 to 120 Hz (e.g., 120 Hz) and a temperature of 25° C. For example, the capacitor may exhibit an energy density of about 2.0 joules per cubic centimeter (J/cm³) or more, in some embodiments about 3.0 J/cm³, in some embodiments from about 3.5 J/cm³ to about 10.0 J/cm³, and in some embodiments, from about 4.0 to about 8.0 J/cm³. The capacitance may likewise be about 1 milliFarad per square centimeter ("mF/cm²") or more, in some embodiments about 2 mF/cm² or more, in some embodiments from about 5 to about 50 mF/cm², and in some embodiments, from about 8 to about 20 mF/cm². The capacitor may also exhibit a relatively high "breakdown voltage" (voltage at which the capacitor fails), such as about 180 volts or more, in some embodiments about 200 volts or more, and in some embodiments, from about 210 volts to about 260 volts.

The equivalent series resistance ("ESR")—the extent that the capacitor acts like a resistor when charging and discharging in an electronic circuit—may also be less than about 15,000 milliohms, in some embodiments less than about 10,000 milliohms, in some embodiments less than about 5,000 milliohms, and in some embodiments, from about 1 to about 4,500 milliohms, measured with a 2-volt bias and 1-volt signal at a frequency of 120 Hz. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 $\mu A/\mu F*V$, in some embodiments less than about 0.5 $\mu A/\mu F*V$, and in some embodiments, less than about 0.1 $\mu A/\mu F*V$, where $\mu A$ is microamps and $\mu F*V$ is the product of the capacitance and the rated voltage. Leakage current may be measured using a leakage test meter (e.g., MC 190 Leakage test, Mantracourt Electronics LTD, UK) at a temperature of 25° C. and at a certain rated voltage after a charging time of from about 60 to about 300 seconds. Such ESR and normalized leakage current values may even be maintained after aging for a substantial amount of time at high temperatures. For example, the values may be maintained for about 100 hours or more, in some embodiments from about 300 hours to about 2500 hours, and in some embodiments, from about 400 hours to about 1500 hours (e.g., 500 hours, 600 hours, 700 hours, 800 hours, 900 hours, 1000 hours, 1100 hours, or 1200 hours) at temperatures ranging from about 100° C. to about 250° C., and, in some embodiments from about 100° C. to about 200° C. (e.g., 100° C., 125° C., 150° C., 175° C., or 200° C.).

The electrolytic capacitor of the present invention may be used in various applications, including but not limited to medical devices, such as implantable defibrillators, pacemakers, cardioverters, neural stimulators, drug administering devices, etc.; automotive applications; military applications, such as RADAR systems; consumer electronics, such as radios, televisions, etc.; and so forth. In one embodiment, for example, the capacitor may be employed in an implantable medical device configured to provide a therapeutic high voltage (e.g., between approximately 500 volts and approximately 850 volts, or, desirably, between approximately 600 Volts and approximately 900 volts) treatment for a patient. The device may contain a container or housing that is hermetically sealed and biologically inert. One or more leads are electrically coupled between the device and the patient's heart via a vein. Cardiac electrodes are provided to sense cardiac activity and/or provide a voltage to the heart. At least a portion of the leads (e.g., an end portion of the leads) may be provided adjacent or in contact with one or more of a ventricle and an atrium of the heart. The device may also contain a capacitor bank that typically contains two or more capacitors connected in series and coupled to a battery that is internal or external to the device and supplies energy to the capacitor bank. Due in part to high conductivity, the capacitor of the present invention can achieve excellent electrical properties and thus be suitable for use in the capacitor bank of the implantable medical device.

The present invention may be better understood by reference to the following example.

EXAMPLE 1

An anode for use in the capacitor of the present invention was formed in the following manner. Initially, both ends of a pre-cut tantalum lead wire were bent. The bent wire was placed into a slot in the bottom half of a mold. The cavity of the mold was then filled with C255 flake tantalum powder (Cabot Corp.) and polyethylene glycol lubricant (0.5%). A hydraulic press was used to compress both sides of the powder to a density of about 5.0 g/cm³ density. The samples were vacuum sintered in a multi-stage process at a temperature from 800° C. to 1675° C. Upon sintering, all of the samples were dipped into a solution containing 50% glycol/water with $H_3PO_4$ at a temperature of 85° C. and a conductivity of 1.3 mS/cm. A current was applied until the formation current density was 45 mA/g and the voltage was 200 volts. A second formation was then performed at a current density of 23 mA/g and formation voltage of 236 volts. Following these formations, the oxide was annealed in air at 380° C. for 60 minutes. The anode was then reformed at a voltage of 236 volts for 15 minutes at 85° C. The resulting anode had a D-shape in which the length "L" was about 37 millimeters, the width "W" was about 20 millimeters, and the thickness "H" was about 2.1 millimeters (FIGS. 2-3).

EXAMPLE 2

A cathode for use in the capacitor of the present invention was formed in the following manner. A sheet of 0.127 mm thick titanium foil was cut to the dimensions of 45 mm×25 mm. One side of the foil was sandblasted using SiC media for 10 s and then cleaned in an ultrasonic bath using Alconox soap (11 wt % solution) for 10 minutes. The sheet was then rinsed with flowing deionized water and dried in air at ambient temperature. A nickel lead wire (0.50 mm diameter×45 mm long) was attached to the smooth side of the sheet by spot welding the wire onto a corner of the foil.

Two cathode plates were used to sandwich one anode so the lead wire for a second cathode foil was spot welded in the mirrored corner of a second piece to make a set. After attaching the lead wires, the smooth side of the metal foil was masked with Kapton™ adhesive tape. Clevios™ CB-40 was poured into a glass crystallization dish and the titanium foils were placed into the dish. The crystallization dish was filled to a level that completely covered the plates—but did not cover the nickel leadwire. The titanium sheet was kept submerged in the Clevios™ CB-40 solution for 10 seconds and then withdrawn slowly so that the excess CB-40 was allowed to drain off. The foil was placed into a separate crystallization dish and the CB-40 coating was allowed to completely dry at ambient temperature. Next, Clevios™ M was poured into a crystallization dish and the now dried CB-40 coated Ti foils were placed into the Clevios™ M solution. After 10 seconds, the foil was quickly removed from the solution and placed into a crystallization dish in a control humidity chamber (RH>70%), and the Clevios™ M was allowed polymerize for 30-35 minutes. After polymerization, the foils were soaked in methanol in a crystallization dish, where the foils were completely covered. Foils were soaked in methanol for 10 minutes, and then the methanol solution was discarded. The soaking step was repeated until the methanol solution was clear. The coatings steps were repeated three more times to produce a uniform, smooth PEDT coating.

EXAMPLE 3

A working electrolyte for use in the capacitor of the present invention was formed according to the following procedure.
1. Pour 536.0 g of deionized water in a 2000 ml glass beaker with a magnetic stir bar;
2. Add 213.0 g of ammonium adipate and mix to complete dissolution;
3. Add 10.0 g 4-nitrobenzoic acid, mix for 10 minutes;
4. Add 258.0 g ethylene glycol, mix to complete dissolution;
5. Add 0.3 g 3-methyl-4-nitrobenzoic acid, mix to complete dissolution;
6. Add 7.5 g ethylenediaminetetraacetic acid and mix to complete dissolution; and
7. Add 5.0 g phosphoric acid and mix for 5 min.

The pH value of the resulting solution was 6.5 and the conductivity was 44.3 mS/cm. Gelling of the above electrolyte was accomplished by using fumed silica (Sigma Aldrich). 94 g of the above electrolyte was initially poured into a 250-ml beaker and then 6 g of fumed silica (0.007 μm) was added to the electrolyte. An ultrasonic dismembrator (Fisher Scientific Model P50) probe was used for dispersing the fumed silica into the electrolyte, with a the power setting on the ultrasonic of the ultrasonic probe is approximately 66% of maximum power and a mixing time of approximately 10 minutes. After mixing the dispersion was very fluid with no agglomerates. The dispersion remained fluid with low viscosity for at least several hours, but became fully gelled within approximately 2 days. For viscosity measurements a Brookfield spindle viscometer was used. Initial viscosity measurements were made within 1 hour of addition of the gelling agent to the electrolyte. The table below shows viscosities obtained by the Brookfield measurement method:

| Electrolyte (g) | $SiO_2$ (g) | $SiO_2$ (wt. %) | Spindle Number | Viscosity (cps) | RPM |
|---|---|---|---|---|---|
| 100 | 0 | 0 | 1 | 6.4 | 60 |
| 98 | 2 | 2 | 2 | 7.0 | 60 |
| 94 | 6 | 6 | 3 | 8.0 | 60 |

The low initial viscosity of the 6 wt. % $SiO_2$ gelled electrolyte allowed the material to be easily handled with micropipettes to permit precision filling of the capacitor cells; however, after 12 hours the gelled electrolyte was considerably thickened and after approximately 48 hours the electrolyte became semi-solid and would not flow if a beaker of the material was inverted.

Material structural changes were also measured at 25° C. using a rheometer (TA Instruments Model AR1000) with a cone plate configuration: a 4 cm stainless steel cone with 0.28 degree angle was used for the gelled electrolytes and for the liquid electrolyte a 6-cm acrylic cone with a 2 degree angle was used. To characterize both liquid and gelled materials the testing was done in oscillatory mode. Three samples of electrolyte with 6 weight % fumed silica were measured: 1 hour after preparation, 48 hours after mixing, 1 month after mixing. An oscillatory frequency of 10 Hz and pressure of 5 Pa was applied for each sample measurement.

| 6% Gel Sample | Phase Angle δ (°) | Storage modulus G' (kPa) |
|---|---|---|
| 1 hr after mixing | 99.32 | (−) 0.002 |
| 48 hr after mixing | 1.20 | 8.0 |
| ~1 month after mixing | 0.82 | 23.4 |

As indicated, the freshly prepared electrolyte showed behavior of a low viscosity liquid as indicated by the phase angle of approximately 90° and a storage modulus that is essentially 0 kPa. The electrolyte that aged for at least 48 hours was fully gelled with solid elastic behavior indicated by a storage modulus in excess of 5 kPa and a low phase angle of approximately 1°.

The density of the electrolytes was also measured using a hydrometer (Fisher Scientific). The results are set forth below.

| $SiO_2$ (wt %) | Density (specific gravity) g/cm³ |
|---|---|
| 0 | 1.09 |
| 0.10 | 1.09 |
| 0.25 | 1.09 |
| 0.50 | 1.09 |
| 0.75 | 1.10 |
| 1.00 | 1.10 |
| 2.00 | 1.12 |

As indicated, the specific gravity increased measurably after the addition of 0.75 wt % of the fumed silica. When more than 2 wt % of fumed silica was added the specific gravity was higher than the range of the hydrometer (1.220 g/cm³).

Experiments were also done to assess the long-term stability of the gelled electrolyte system when directly exposed to air. A test cell was made with a cylindrical anode having a $Ta_2O_5$ dielectric of 175V formed over a tantalum slug in a Ta can whose interior of the Ta can was coated with a conductive polymer cathode as described above. The anode was impregnated with the described electrolyte that did not contain the fumed silica. Two sets of test cells were made, one where the annulus around the anode in the Ta can was filled with ungelled electrolyte, and the other was filled with 6 wt % fumed silica dispersed in the electrolyte. In both cases the Ta cans were not sealed, rather, they were left open to the atmosphere. The results are set forth below.

| Time after Assembly | 1 hour | 24 hours | 48 hours | 700 hours |
|---|---|---|---|---|
| Ungelled 120 Hz Cap (μF) | 188.6 | Not tested, electrolyte crystallized | — | — |
| Ungelled 120 Hz ESR (ohms) | 6.24 | Not tested, electrolyte crystallized | — | — |
| Gelled 120 Hz Cap (μF) | 191.7 | 188.9 | 191.5 | 192.5 |
| Gelled 120 Hz ESR (ohms) | 7.54 | 7.45 | 7.00 | 6.11 |

As indicated above, the ungelled material dried out and crystallized within one day, but the gelled one remained functional after 700 hours. This demonstrates the stabilization of the electrolyte with addition of the fumed silica.

EXAMPLE 4

Open cell capacitors were prepared from the anode of Example 1, the cathode of Example 2, and the electrolyte of Example 3 as follows. First, a copper leadwire was resistance welded to the end of the tantalum anode wire and then the welded joint was coated with RTV-type sealant and covered with heat shrink tubing to provide electrical insulation and stain relief. Second, the leaded anode was placed in a plastic vial and electrolyte containing 2 wt. % fumed silica gelling agent was added to the vial to just cover the anode. Third, vials containing anodes and electrolyte were placed in a vacuum chamber and evacuated to approximately 30 inches of Hg for 2-4 hours infiltrate the porous anode with electrolyte.

The test cells were assembled as follows: a) surfaces of two cathodes were coated with electrolyte containing freshly dispersed 6 wt % fumed silica; b) rectangular pieces of cellulose separator, (e.g., PXW7D from Nippon Kodoshi Corporation) that were approximately 10% larger (length and width) than the cathode foils were pressed into place on the electrolyte-coated cathode such that the separator extended past all four edges of the cathode foil and then c) the previously infiltrated anode was sandwiched between the two separator-cathode foils. The entire assemblage of cathode-separator-anode-separator-cathode was lightly clamped between two plastic blocks held with nylon screws. The clamped assembly was in turn placed in a plastic vial which was then filled with electrolyte containing 6 wt. % fumed silica until the anode was fully covered. Anode and cathode leadwires were routed through small holes in the plastic cap on the vial to complete assembly of the test cell. Finally, the open cell capacitor was placed in a vacuum chamber which was evacuated to approximately 30 inches of Hg for 1-2 hours to remove entrapped air.

Capacitor cells were tested for capacitance and equivalent series resistance (ESR) from 40-10,000 Hz using commercially available instrumentation (e.g., Agilent 4294A Precision Impedance Analyzer) and subjected to a series of charge-discharge cycles using different load resistors to evaluate the energy capacity of the device. Specifically, the open cell capacitors were charged to a predetermined voltage at currents of 5-10 milliamps using a Keithley 237 High Voltage Sourcemeter and then discharged into load resistors of 10,000 ohms or 50 ohms. The discharge voltage across the resistor versus time was recorded using a Tektronix 784A oscilloscope. Cumulative energy was calculated from the measured discharge voltage by integrating the voltage squared divided by load resistance with respect to time. Additionally, capacitors cells were charged to predetermined voltage and then held at voltage for up to 300 seconds while monitoring voltage across a 1,000 ohm series resistor, i.e., leakage current. The results are set forth below.

| Sample | Electrolyte | 120 Hz Cap (µF) | 120 Hz ESR (Ω) | 3 RC 10,000-ohm Cumulative Energy (J) | 2 RC 50-ohm Cumulative Energy (J) | 60 second Leakage Current at 210 V (µA) |
|---|---|---|---|---|---|---|
| Control 1 | Ungelled | 405.5 | 0.707 | 9.48 | 8.99 | 112 |
| Control 2 | Ungelled | 403.2 | 0.706 | 9.41 | 8.98 | 104 |
| 1 | Gelled | 411.1 | 0.761 | 9.45 | 9.02 | 80 |
| 2 | Gelled | 408.4 | 0.773 | 9.38 | 8.91 | 96 |
| 3 | Gelled | 412.2 | 0.785 | 9.46 | 9.07 | 96 |
| 4 | Gelled | 405.3 | 0.811 | 9.40 | 8.91 | 120 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A wet electrolytic capacitor comprising:
   an anode comprising an anodically oxidized pellet formed from a pressed and sintered powder, wherein the powder is formed from tantalum particles;
   a cathode that comprises a metal substrate coated with a conductive polymer; and
   a working electrolyte in communication with the anode and the cathode, wherein the working electrolyte is in the form of a gel and comprises an ammonium salt of an organic acid, inorganic oxide particles, an acid, and an aqueous solvent system that comprises water, wherein the working electrolyte has a pH value of from about 5.0 to about 8.0.

2. The wet electrolytic capacitor of claim 1, wherein the working electrolyte has a pH value of from about 6.0 to about 7.0.

3. The wet electrolytic capacitor of claim 1, wherein the working electrolyte has a conductivity of from about 10 to about 80 milliSiemens per centimeter, determined at a temperature of 25° C.

4. The wet electrolytic capacitor of claim 1, wherein the working electrolyte has a conductivity of from about 20 to about 60 milliSiemens per centimeter, determined at a temperature of 25° C.

5. The wet electrolytic capacitor of claim 1, wherein the working electrolyte exhibits a phase angle δ of from 0° to about 20°.

6. The wet electrolytic capacitor of claim 1, wherein the working electrolyte exhibits a phase angle δ of from about 0.2° to about 2°.

7. The wet electrolytic capacitor of claim 1, wherein the working electrolyte exhibits a storage modulus G' of about 5 kilopascals or more.

8. The wet electrolytic capacitor of claim 1, wherein the capacitor is capable of being charged to an operating voltage of from about 200 volts to about 240 volts, and wherein the pellet of the anode is anodically oxidized at a formation voltage of from about 220 volts to about 250 volts.

9. The wet electrolytic capacitor of claim 1, wherein the organic acid of the ammonium salt is a polyprotic acid.

10. The wet electrolytic capacitor of claim 9, wherein the polyprotic acid is adipic acid, α-tartaric acid, meso-tartaric acid, oxalic acid, lactic acid, or a combination thereof.

11. The wet electrolytic capacitor of claim 1, wherein ammonium salts of organic acids constitute from about 5 wt. % to about 35 wt. % of the working electrolyte.

12. The wet electrolytic capacitor of claim 1, wherein the acid includes ethylenediaminetetraacetic acid.

13. The wet electrolytic capacitor of claim 1, wherein acids constitute from about 0.01 wt. % to about 10 wt. % of the working electrolyte.

14. The wet electrolytic capacitor of claim 1, wherein the solvent system further includes a secondary solvent.

15. The wet electrolytic capacitor of claim 14, wherein the secondary solvent is ethylene glycol.

16. The wet electrolytic capacitor of claim 14, wherein water constitutes from about 35 wt. % to about 66 wt. % of the electrolyte and secondary solvents constitute from about 10 wt,% to about 35 wt. % of the electrolyte.

17. The wet electrolytic capacitor of claim 1, wherein the inorganic oxide particles constitute from about 1 wt. % to about 15 wt. % of the electrolyte.

18. The wet electrolytic capacitor of claim 1, wherein the inorganic oxide particles have an average particle size of from about 1 to about 500 nanometers and a specific surface area of from about 100 m$^2$/g to about 600 m$^2$/g.

19. The wet electrolytic capacitor of claim 1, wherein the inorganic oxide particles are fumed silica particles.

20. The wet electrolytic capacitor of claim 1, wherein the anode is planar and has a thickness of about 5 millimeters or less.

21. The wet electrolyte capacitor of claim 20, wherein a leadwire extends from the planar anode that has a bent configuration.

22. The wet electrolytic capacitor of claim 20, wherein the planar anode has a D-shape.

23. The wet electrolytic capacitor of claim 1, wherein the tantalum particles are flake particles having an aspect ratio of from about 2 to about 100.

24. The wet electrolytic capacitor of claim 1, wherein the metal substrate includes titanium.

25. The wet electrolytic capacitor of claim 1, wherein the conductive polymer is a substituted polythiophene.

26. The wet electrolytic capacitor of claim 25, wherein the substituted polythiophene is poly(3,4-ethylenedioxythiophene).

27. An implantable medical device comprising the wet electrolytic capacitor of claim 1.

28. A method for forming a wet electrolytic capacitor, the method comprising:

forming a mixture that comprises an ammonium salt of an organic acid, inorganic oxide particles, an acid, and an aqueous solvent system that comprises water;
 inducing gelation of the mixture so that it exhibits a first phase angle δ of from about 50° to 90°;
 placing the gelled mixture into communication with an anode, cathode, or both, wherein the anode comprises an anodically oxidized pellet formed from a pressed and sintered powder wherein the powder is formed from tantalum particles, and the cathode comprises a metal substrate coated with a conductive polymer; and
 thereafter, allowing the mixture to further gel to form a working electrolyte that exhibits a second phase angle δ of from 0° to about 20°, wherein the working electrolyte further has a pH value of from about 5.0 to about 8.0.

29. The method of claim 28, wherein gelation is ultrasonically induced.

30. The method of claim 28, wherein the anode is impregnated with the gelled mixture.

31. The method of claim 28, wherein the gelled mixture exhibits a viscosity of from about 1 to about 40 centipoise as determined using a Brookfield LVT viscometer (spindle #3 at 60 rpm) at a temperature of 25° C.

32. The method of claim 28, wherein the gelled mixture exhibits a phase angle δ of from about 80° to 90° and the working electrolyte exhibits a phase angle δ of from 0.2° to about 2°.

33. The method of claim 28, wherein the gelled mixture exhibits a storage modulus G' of about 0.01 kPa or less and the working electrolyte exhibits a storage modulus of about 5 kPa or more.

34. The method of claim 28, wherein the electrolyte is allowed to further gel for at least 48 hours.

\* \* \* \* \*